United States Patent
Backer (10) Patent No.: US 8,015,484 B2
(45) Date of Patent: Sep. 6, 2011

(54) REPUTATION SYSTEM FOR WEB PAGES AND ONLINE ENTITIES

(76) Inventor: Alejandro Backer, Altadena, CA (US)

( * ) Notice: Subject to any disclaimer, the term of this patent is extended or adjusted under 35 U.S.C. 154(b) by 1245 days.

(21) Appl. No.: 11/704,730

(22) Filed: Feb. 9, 2007

(65) Prior Publication Data

US 2007/0208613 A1    Sep. 6, 2007

Related U.S. Application Data

(60) Provisional application No. 60/772,063, filed on Feb. 9, 2006, provisional application No. 60/772,301, filed on Feb. 9, 2006.

(51) Int. Cl.
*G06F 17/27* (2006.01)
(52) U.S. Cl. ........................................ 715/234
(58) Field of Classification Search .................. 715/234
See application file for complete search history.

(56) References Cited

U.S. PATENT DOCUMENTS

| | | | |
|---|---|---|---|
| 6,327,656 B2 | 12/2001 | Zabetian | |
| 6,640,301 B1 | 10/2003 | Ng | |
| 6,895,385 B1* | 5/2005 | Zacharia et al. | 705/10 |
| 7,444,380 B1 | 10/2008 | Diamond | |
| 7,603,350 B1* | 10/2009 | Guha | 1/1 |
| 7,752,554 B2* | 7/2010 | Biggs et al. | 715/752 |
| 2002/0046250 A1 | 4/2002 | Nassiri | |
| 2002/0059525 A1 | 5/2002 | Estes | |
| 2002/0186838 A1 | 12/2002 | Brandys | |
| 2003/0028767 A1 | 2/2003 | Bickford et al. | |
| 2003/0212791 A1 | 11/2003 | Pickup | |
| 2004/0024823 A1 | 2/2004 | Del Monte | |
| 2004/0122926 A1* | 6/2004 | Moore et al. | 709/223 |
| 2005/0097319 A1* | 5/2005 | Zhu et al. | 713/166 |
| 2005/0198511 A1 | 9/2005 | Tomkow | |
| 2006/0009994 A1* | 1/2006 | Hogg et al. | 705/1 |
| 2006/0143136 A1 | 6/2006 | Low et al. | |
| 2006/0212703 A1* | 9/2006 | Kojima | 713/175 |
| 2006/0253579 A1* | 11/2006 | Dixon et al. | 709/225 |
| 2008/0046511 A1* | 2/2008 | Skrenta | 709/204 |

OTHER PUBLICATIONS

Non-final Office Action issued by the USPTO for U.S. Appl. No. 11/704,729 dated Jun. 11, 2010.
S. Brin, L. Page: The Anatomy of a Large-Scale Hypertextual Web Search Engine. Computer Networks and ISDN Systems, vol. 30, pp. 107-117, Apr. 1998.
Page, Lawrence, Brin, Sergey, Motwani, Rajeev and Winograd, Terry. "The PageRank Citation Ranking: Bringing Order to the Web." Stanford InfoLab, pp. 1-17, Nov. 1999. Technical Report accessed at http://ilpubs.stanford.edu:8090/422/ on Sep. 17, 2010.

* cited by examiner

*Primary Examiner* — Laurie Ries
*Assistant Examiner* — Tionna Smith
(74) *Attorney, Agent, or Firm* — Steinfl & Bruno LLP

(57) ABSTRACT

A method for providing a measure of trust for each participant in a network is disclosed, together with a method to calculate it automatically. In particular, a method for rating online entities, such as online identities is provided, which also takes into account the reputation of the raters.

10 Claims, 5 Drawing Sheets

| | R1 | R2 | | a@b |
|---|---|---|---|---|
| S1 | 1 | 0 | | 2 |
| S2 | 1 | 1 | ·· | 4 |
| ⋮ | | | ·· | 0 |
| SN | | | ·· | 1 |

$$\underbrace{\qquad\qquad\qquad\qquad}_{A}$$

$$R(A) = \begin{pmatrix} r(R_1) \\ r(R_2) \\ \vdots \\ r(a@b) \\ \vdots \end{pmatrix}$$

REPUTATION SYSTEM FOR WEB PAGES AND ONLINE ENTITIES

RELATED APPLICATIONS

The present application claims the benefit of U.S. Provisional Application No. 60/772,063 filed on Feb. 9, 2006 and U.S. Provisional Application No. 60/772,301 filed on Feb. 9, 2006, the contents of both of which are incorporated by reference herein. The present application may be related to U.S. Ser. No. 11/704,729, filed on even date herewith, entitled "Method and System for Authentication of Electronic Communications", also incorporated by reference in the present application.

STATEMENT OF GOVERNMENT INTEREST

This invention was made in part with government support under a MICS Lab CFD, Grid and Other AMD grant awarded by the Office of Science of the DOE. The U.S. Government may have certain rights in the invention.

BACKGROUND

Field

The present disclosure relates to the Internet and networks in general. In particular, it relates to a reputation system for web pages and online entities.

Currently, Internet surfers or, more generally, participants in a network, have little way to know the reputation of a given web page, web site or person represented by an online entity (e.g. in a social network, to distinguish trusted people from would-be predators).

Trust is a fundamental quality of individuals interacting in human societies. It is essential for the functioning of many societal institutions, including immigration control, credits and loans, and national security. Thus, a measure of trust would have many applications in these domains and others. Unfortunately, trust has been difficult to measure, and particularly hard to measure in an automated way.

In a security context, trust is important for several reasons. First, surveillance is expensive, and thus limiting the number of targets is extremely important. Quantifying the trust associated with each person or entity in a network would be useful to concentrate scarce surveillance resources where they matter most. Second, trust is important for the evaluation of the reliability of tips about suspicious activity. The population at large's eyes and ears would constitute perhaps the best defense against terrorists if there weren't so many false alarms which currently make following up on tips intractable. The false alarm problem would be much alleviated if a systematic measure of the trust of individual tip providers was available.

Spam, or electronic communications unwanted by recipients, is a growing problem, to the point that many users receive more spam than desirable email. The problem is even driving pushes for new legislation. Because email travels along global communication networks, though, solutions at the national level are unlikely to succeed. Although anti-spam software exists, spammers are continually modifying the text of their messages, in an evolutionary race to beat anti-spam software. Inevitably, anti-spam software that relies on text filtering is one step behind spam.

There are two main reasons why it is so hard to enforce spam control. One is that senders regularly fake the sender's email address. This problem is addressed by related patent application, "Method and System for Authentication of Electronic Communications", by the same applicant of the present disclosure, U.S. Ser. No. 11/704,729, filed on the same day of the present application, which is incorporated herein by reference in its entirety. The second reason is that spammers regularly obtain valid email addresses of their own, which they would be able to authenticate as their legal owners, but which exist only for brief periods of time, for the sole purpose of sending one spam campaign.

A further problem lies in that we live in an era of information overload. Electronic communications constitute a growing fraction of the information that a professional must digest and process daily. The boom of low-cost communications is putting tremendous demands on the time of individual professionals. Systems to efficiently and automatically prioritize electronic communications are urgently needed.

The web site repcheck dot com provides a way to rate the reputation of people over the Internet. However, the system is not particularly user-friendly because it does not employ tags and does not use a tag bar, thus forcing people to go to a third party site to tag and/or read about a person. Moreover, the system does not allow multiple ratings for different tags, confusing high ratings for one reason (e.g. honest) with high ratings for another reason (e.g smart). Further, the site only works for people, not pages or sites.

The web site rapleaf dot corn allows to look people up (by way of their e-mail address) before a purchase or a sale, and rate them afterwards. However, this site does not take into account the rater's reputation. Moreover, the system does not allow multiple ratings for different tags, confusing high ratings for one reason (e.g honest) with high ratings for another reason (e.g. smart). In addition, people cannot rate and read ratings right from their browser as they are visiting the page. Further, only e-mail addresses can be rated. Given that many people do not know the e-mail address of a web site they are considering transacting business with, the usefulness of such method is limited.

The web site del.icio.us allows users to tag web pages, but these tags are not used as bookmarks to find web pages, nor as descriptors of web pages to be used when visiting the pages, nor do they include any measure of trust or reputation, nor one that takes the tagger's reputation into account.

SUMMARY

The present disclosure addresses the above problems by providing a global measure of trust for each participant in a network as well as a method to calculate it automatically. In particular, a method for rating online entities, such as online identities, is provided, which also takes into account the reputation of the raters.

According to a first embodiment, a method for rating an online entity in accordance with a tag is provided, the method comprising: arranging the online entity to be rated by a plurality of raters in accordance with the tag; assigning a rater's score to the raters rating the online entity with the tag, to establish reputation of the raters; assigning a tag score to the online entity, the tag score depending on i) ratings provided by the raters to the online entity in accordance with the tag, and ii) the reputation of all raters rating the online entity with the tag.

According to a second embodiment, a method to establish trust in e-mail communications between senders and receivers is provided, comprising: assigning a trust score to an online entity represented by an e-mail address, the trust score depending on: i) amount of communications received by the e-mail address; and ii) a trust indication of all senders of the communications to the e-mail address.

According to a third embodiment, a method of authenticating an association between a user and a web page is provided, comprising: requesting the user to place a code in the web page; searching the code in the web page; and upon finding the code, authenticating the association.

According to a fourth embodiment, a method for rating an online entity is provided, the method comprising: arranging the online entity to be rated by a plurality of raters; assigning a rater's score to the raters rating the online entity, to establish reputation of the raters; and assigning a score to the online entity, the score depending on i) ratings provided by the raters to the online entity, and ii) the reputation of all raters rating the online entity, wherein assigning the score to the online entity is established through a raters/entities matrix associated with a graph connecting the raters and the online entity.

According to a fifth embodiment, a method of authenticating an association between a user or owner of an e-mail address and a web page is provided, comprising: requesting the user or owner of the e-mail address to place a code in the web page; searching the code in the web page; and upon finding the code, authenticating the association.

According to a sixth embodiment, a method for rating an online entity is disclosed, the method comprising: arranging the online entity to be rated by a plurality of raters; assigning a rater's score to the raters rating the online entity, to establish reputation of the raters; and assigning a score to the online entity, the score depending on i) ratings provided by the raters to the online entity, and ii) the reputation of all raters rating the online entity, wherein assigning the score to the online entity is established through a raters/entities matrix associated with a graph connecting the raters and the online entity.

According to a seventh embodiment, a toolbar for a web browser is disclosed, the toolbar comprising tags, description, reviews or ratings assigned to a web page being visited by a user.

According to an eighth embodiment, a toolbar for a web browser is provided, the toolbar comprising ads relevant to the web page being visited.

Further embodiments are present throughout the specification and in the claims of the present application.

The trust measure proposed herein is dependent on the network of "endorsements" between members of the network. These endorsements can come in a variety of ways, from explicit declarations of trust between individual members of a networks to implicit measures gleaned from the users' behavior. Different endorsements can signify trust in different contexts.

The trust measure is global and network-based because the trust assigned to individual components of the network depends on interactions throughout the network. The reason for this is that a node's trust depends not only on who it is trusted by, but also on how trustworthy each of these is. In an aspect of the present disclosure, this gives rise to a recursive formula, whose solution is specified by the present disclosure.

In accordance with the present disclosure, trust can be used as a proxy for reliability. If a given component X of a system of interdependent parts is relied upon by many other components, and if these other components are reliable, then X must be reliable, too. Thus, the present disclosure provides a measure for the reliability of components in material systems, such as electronic systems, in addition to those of social networks.

As used in the present disclosure, a tag is a rating language or rating sign (thumbs, stars, cool, trustworthy, scientific, beauty, etc) associated with an online entity. An online entity can be a way a physical or commercial person is electronically known through the Internet, e.g. a web page, a web site, an online profile, an e-mail address, a telephone number and so on. The online entity can include products (e.g. identified by a bar code, product code, or any other description) or ant tagged or taggable subject.

DETAILED DESCRIPTION

The method according to the present disclosure is modeled on reputation in actual human communication networks. In order to communicate with trusted members of a network, a human user usually has to first acquire some degree of trust: a bum off the street would find it hard to get a multinational CEO's attention, for example. This system works due to accountability. The present disclosure endows individual online identities with a measure of trust. This trust measure is a global function of communications in the network, and does not require a recipient to know a given sender in order to trust communications from said sender. Instead, trust has a transitive property, such that if A trusts B, and B trusts C, then A will trust C to some degree. For global reputation of scoring, this transitive property does not stop at any particular number of node traversals, but rather follows an infinite recursion. For local reputation scoring, this transitive property can be made to decay with each node traversal, making ratings by any node more trusted by a node N the closer they are to that node N, as also later shown in the present disclosure.

Trust in E-Mail Communications

Figure 1:
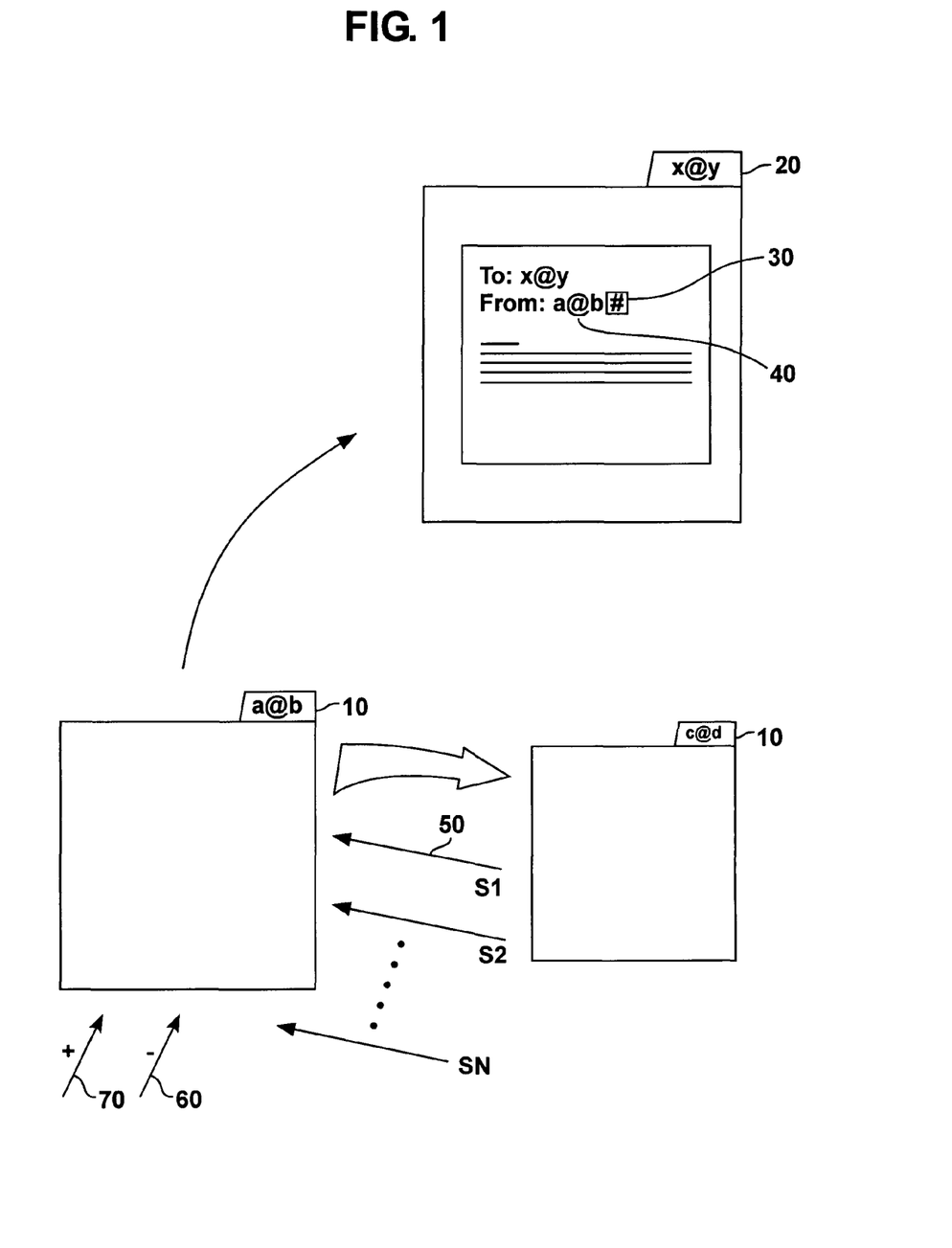
FIG. 1 shows a schematic diagram of e-mail communications between senders and receivers.

FIG. 1 shows a schematic diagram of e-mail communications between senders and receivers where sender 10 is represented by e-mail address a@b and recipient 20 is represented by e-mail address x@y. Each user 10 (whose online identity in this case is an e-mail address a@b) acquires trust points by virtue of receiving correspondence from trusted users S1, S2, . . . SN. In other words, a communication 50 is interpreted as a measure of trust awarded from sender S1 to receiver 10. Note that trust awarded through a communication does not in any way diminish the trust of the sender S1, S2, . . . SN. A sender's trust is divided among all recipients of sender's communications as a monotonous function of the number of communications exchanged. In the simplest such scheme, trust is distributed in proportion to the number of communications exchanged. Trust flows through the system.

Figure 2:
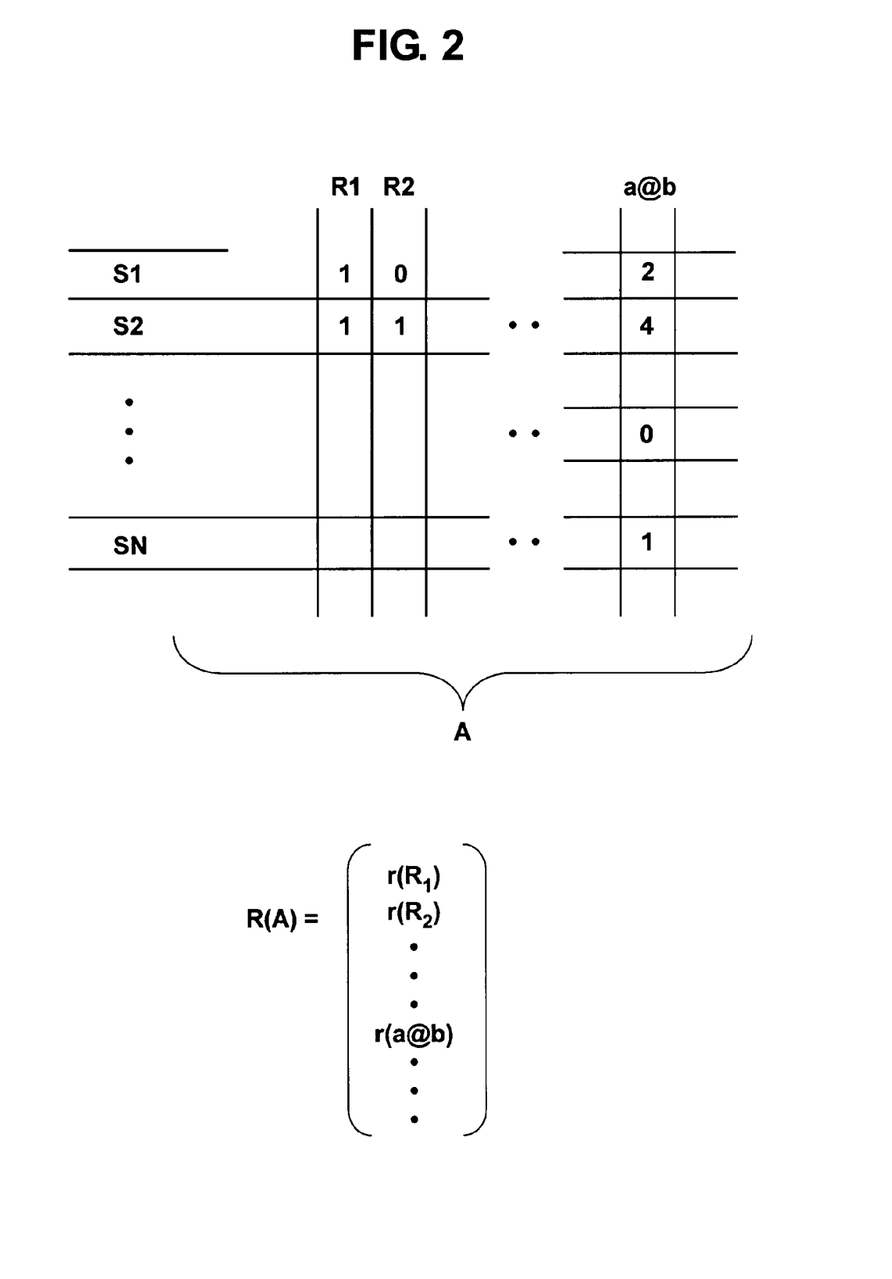
FIG. 2 shows a matrix A associated with senders and receivers of the e-mails together with a dominant eigenvector R(A) of matrix A.

With reference to FIG. 2, let A be a square matrix, each row of which represents a sender (S1, S2, . . . SN) and each column of which represents a recipient (R1, R2, . . . , a@b, . . . ). The trust vector sought by the present disclosure is the dominant eigenvector of A, R(A). The dominant eigenvector of the matrix is the eigenvector corresponding to the eigenvalue of largest magnitude for that matrix. See, for example, S. Brin, L. Page, "The Anatomy of a Large-Scale Hypertextual Web Search Engine" WWW7/Computer Networks. The dominant eigenvector R(A) comprises a plurality of scalar values r(R1), r(R2), r(a@b), ..., each scalar value indicating the score of a particular recipient (or column of the above described matrix A). Of course, a similar result can be obtained by exchanging rows with columns.

The reputation method according to the present disclosure is robust to common manipulations that affect state-of-the-art reputation systems (e.g. EBay's feedback system), such as the creation of numerous identities which endorse each other in an attempt to inflate their trust levels. In particular, until an identity gets endorsements from trusted members of the community, its trust will not increase. The system according to the present disclosure allows a gradual increase in the trust conferred on a particular user throughout the user's lifetime, because as the user receives more email from trusted correspondents, his/her trust will increase.

The rating method can be available to senders S1, S2, ..., SN, 20, for free, allowing widespread adoption of the technology. A user's trust rating 30 (see FIG. 1) can be transmitted in an encrypted way, preventing tampering or unauthorized reading. Recipients 20 (see FIG. 1) can choose to buy software to filter out communications that do not reach the desired trust level. In some embodiments, trust can be computed and transmitted by a third party with access to records of email communications provided by the senders of such communications, to prevent tampering. See related patent application, "Method and System for Authentication of Electronic Communications", by the same applicant of the present disclosure, already mentioned above, incorporated herein by reference in its entirety. In such embodiments, trust of any node can be ascertained by any client submitting a request to a trust authentication server.

Recipients can select their desired trust threshold: high thresholds will allow only the most trusted senders' messages in; low thresholds may allow unwanted spam. Trust thresholds may be varied over time, allowing for an increase in thresholds as the system's use becomes widespread. Recipients can also choose to have the trust level of the sender displayed with every incoming communication, as shown in FIG. 1, allowing rapid prioritization. The person skilled in the art will appreciate that software can be made to automatically prioritize the display of email from senders with higher trust level.

In one embodiment of the present disclosure, user 20's trust of user 10 (see FIG. 1) can also be a function of the distribution of time delays between user 20's reception of communication from user 10 and user 20's response, because more important or trusted people may have their emails responded to more quickly (with less lag or delay) than less important or trusted people.

In a further embodiment, user 20's trust of user 10 can also be a function of the distribution of length of messages from user 20 to user 10 as compared to the lengths of messages from user 10 to user 20, and/or of the ratio computed by dividing the number of messages from user 20 to user 10 over the number of messages from user 10 to user 20, such that users who get a greater fraction of their outgoing messages responded to are assigned greater trust.

In still a further embodiment, trust can be calculated in a distributed computation, with a software application in each user's computer calculating that user's trust iteratively, sending only the trust value itself to the outside world. In some embodiments, the trust of each node N is computed by the information that other nodes convey about the communications that they transmitted to node N. This computation can be performed by each node in the network, or it can be performed by one or more central servers. In this way, no node can attempt to fake its own trust measure.

In another embodiment, trust can be transferred from one identity or email address to another in the case, for example, of a person changing email addresses. See FIG. 1, where online identity 10 is represented both by e-mail address a@b and by e-mail address c@d.

In still another embodiment of the invention, a user's trust can be modified by complaints received against the user (e.g. due to spamming) or endorsements. See arrows 60, 70 shown in FIG. 1. In another embodiment, a user's trust can also be modified by the trust of its recipients—in other words, a user pays the price for (or reaps the benefits of) the value of its "endorsements": recommending untrustworthy users comes at a price, protecting the integrity of the system. In another embodiment, a user's trust is modified by the derivative of the trust of its recipients following endorsement, rewarding risk-taking "finders" who endorse trustworthy beginners and penalizing recipients who endorse spammers or otherwise untrustworthy users.

Figure 3:
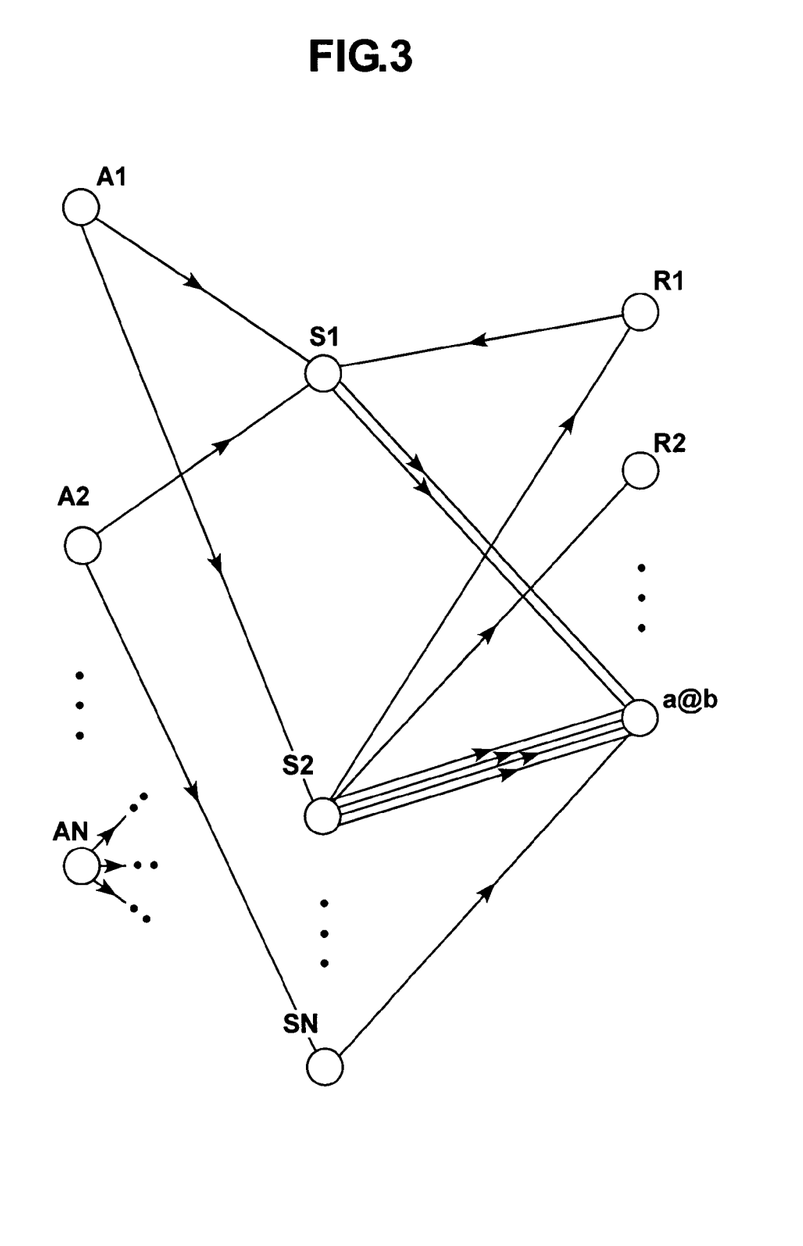
FIG. 3 shows a connectivity graph of communications between senders and receivers.

In an alternative embodiment of the present disclosure, trust conferred on an identity is not a function of the identity alone, but also of a similar function indicating the trust a particular user has of another. This embodiment is particularly useful for recommendation systems, since tastes are based on similarities, which are not transitive, and thus an infinitely regressing transitive property is not desired. It may also be desirable in a reputation system, for example where users need to trust individuals who are not globally trustworthy. In this embodiment, the calculation of trust for a particular user, or recommendation value, starts at said user, and value gets diluted with distance from the user, measured in nodes away in the graph of communication connectivity. For example, if user A writes to 10 users with equal frequency, each of those 10 users would have a 10% trust score from A. If each of those writes to 5 users with equal frequency, each of those 5 users would have a 2% trust score from A. An example of a graph of communication connectivity is shown in FIG. 3. S1 has sent 1 communication to R1 and 2 communications to R2, A1 has sent 1 communication to S1 and 1 communication to S2, and so on.

In another embodiment, trust for each user U is given by a hybrid function combining global trust with a personalized trust function for users close to U, with closeness measured in the sense of distance mentioned above.

Rating of Online Identities in Accordance with a Tag

Figure 4:
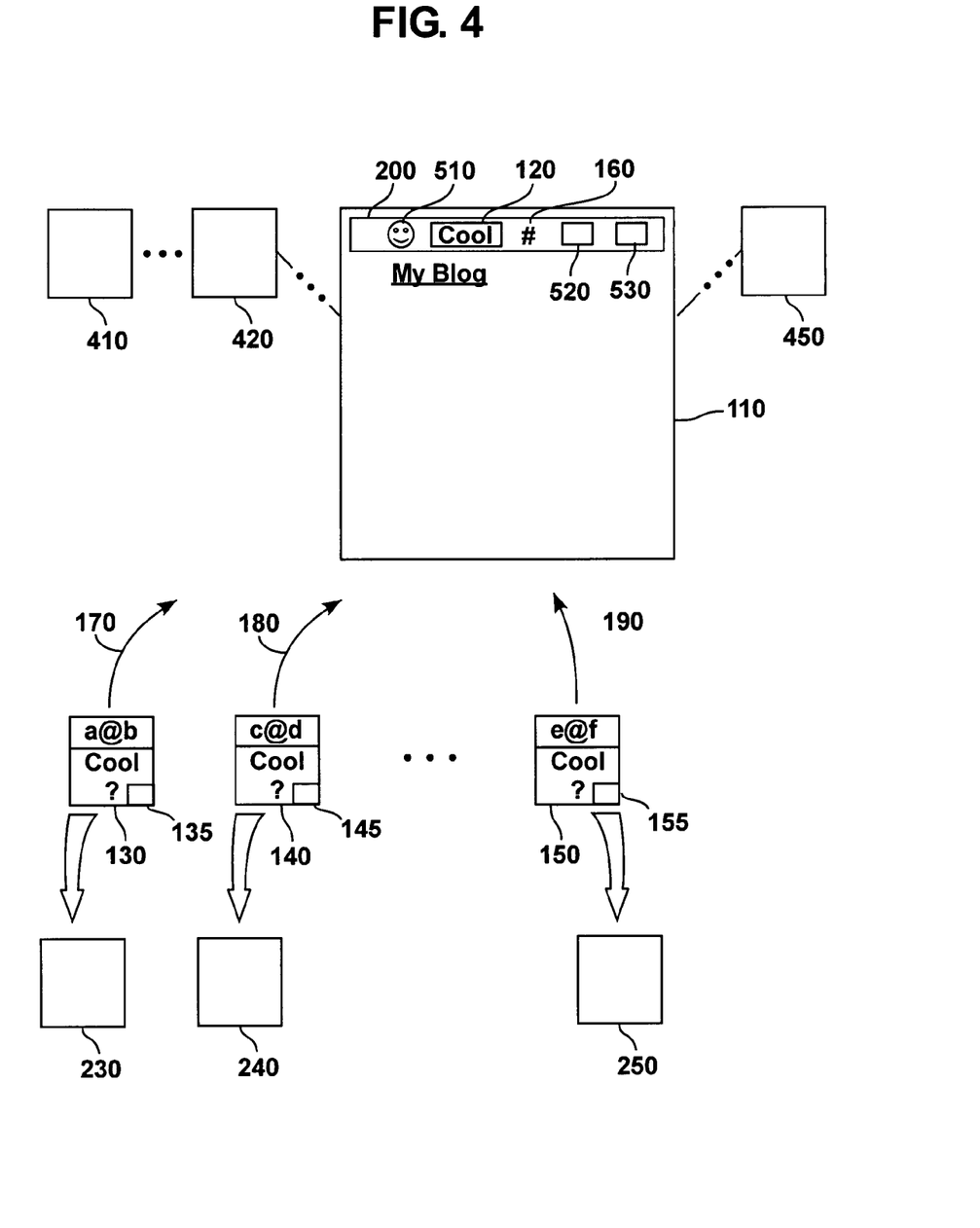
FIG. 4 shows a web page rated by raters in accordance with a tag.

In accordance with an additional embodiment of the present disclosure, Internet surfers can rate individual websites with arbitrary expressions (e.g. text). For example, a user visiting a web site may rate it with a 'Thumbs Up', or with 5 stars, or tag it "cool", "trustworthy" and "scientific." Such tagging can be done, for example, via a toolbar for the user's Internet browser. FIG. 4 shows a web site 110 rated by raters 130, 140, 150 in accordance with a tag 120.

Also raters 170, 180, 190 are rated and their reputation or rating 135, 145, 155 is taken into account when establishing the rating of the web site 110. In order to build a rater's reputation, each rater 170, 180, 190 is associated with a web page 230, 240, 250 (also called online profile, web profile, online identity or web identity throughout the present disclosure). This kind of association can also be established by e-mail addresses or profiles uploaded by one or more users with information identifying the user. Therefore, a rater is rated by other raters in the same way a web page not corresponding to a web identity is rated by that rater or the other raters.

Figure 5:
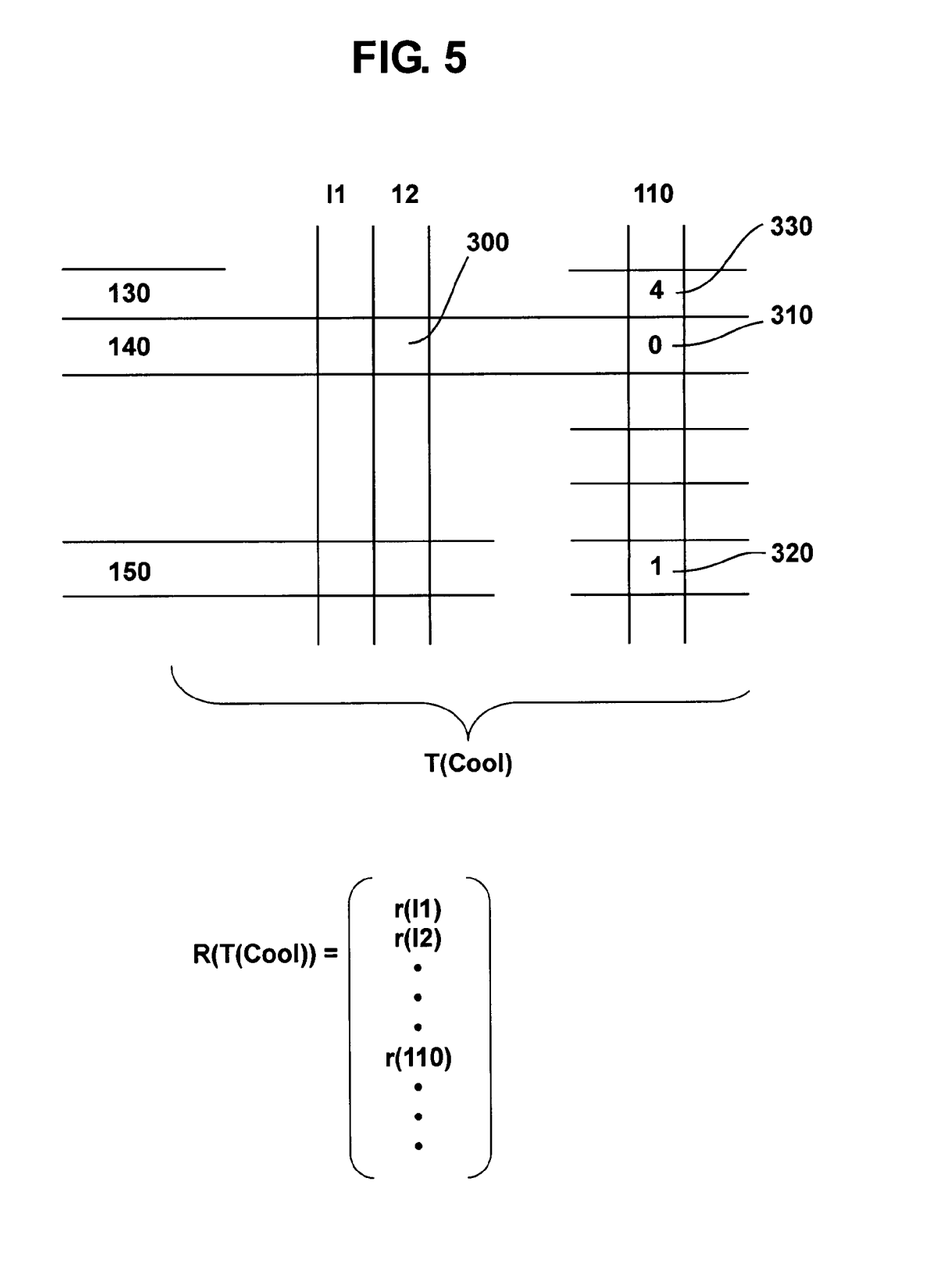
FIG. 5 shows a matrix T associated with a tag.

A graph connecting all web pages and raters is established for each tag, similarly to what was already shown in FIG. 3 with reference to the communication embodiment of the present invention. A rater/web page 'tag matrix' is associated with that graph, as shown in FIG. 5. Rows of the tag matrix denote raters, e.g. 130, 140, 150, and columns of the tag matrix denote web pages, e.g. I1, I2, 110. These web pages sometimes correspond to web pages as such and sometimes correspond to web identities. Each cell 300 represents the rating given by rater 'i' to web page 'j' or rater 'j' (i.e. web identity 'j'). The person skilled in the art will understand that a similar construction can be obtained by exchanging rows with columns.

This rating can be boolean (tags only, e.g. 1 or 0)—see cells 310, 320—or multi-value (e.g. 3 if three stars have been given as a rating)—see cell 330. Similarly to what discussed in the e-mail embodiment of FIGS. 1-3, the reputation for each rated node is given by the dominant eigenvector R(T) of the tag matrix T. The dominant eigenvector will comprise a plurality of scalar values r(I1), r(I2), r(110) . . . , each scalar value indicating the score of a particular page (or column of the above described tag matrix) for that tag.

The eigenvectors and eigenvalues of the matrix associated with the graph are computed, to establish a metric for each web page/tag combination. For example, the web pages tagged as "cool" by people whose associated webpage/online profile has been rated as "cool" will attain a higher "cool" rating than those web pages which have been tagged "cool" by an equivalent number of people who have lower "cool" ratings. Thus, each page is assigned a score for each tag that it has ever been tagged with.

A person skilled in the art will know how to calculate a dominant eigenvector, for example through software packages such as Matlab® by Mathworks® or using the iterative algorithm disclosed in the Brin and Page 1998 paper mentioned above. It typically involves computing the dominant eigenvector iteratively by computing the rank of each rated element j as a function of the ranks of the raters who rated j, and then reiterating. The amount of rating transferred by a rater can be made proportional to the rater's rank and inversely proportional to the number of ratings given by that rater. Alternatively, it can be made independent of the number of ratings given by the rater. The rating of j can be made proportional, in any iteration, to the sum of the amount of rating transferred to it by all raters who rated it.

In a further embodiment of the present disclosure, a same user can be associated with multiple web pages/rated entities 410, 420 as shown in FIG. 4. Should this be the case, the reputation of each web page 110, 410, 420 associated with the user is computed separately, and the reputation for the user is given by the sum of the reputations of each web page associated with him/her. The idea behind the sum is that a person's 'credits and liabilities' are the sum of his credits and liabilities across all of his ventures and/or personas. Adding one unrated site should not diminish the credibility of Bill Gates. However, the person skilled in the art will understand that other embodiments may be possible, such as the average or indeed any function.

Also, in some embodiments, ratings are given by recommendations provided by members of a social network of others in the network or outside of it. In some embodiments, ratings are given by who is in a set of top N friends, such as MySpace®. In other embodiments, ratings are given by who is on a friends list. In general, a rating of user B by user A can be given by inclusion of B in any set generated by A explicitly or implicitly through his/her behavior. For example, somebody can be rated as 'friendly' just by putting him or her in a list of 'friends.'

The reputation for tags with negative connotations (e.g. untrustworthy) should not weigh more heavily tags from users with that negative tag. According to an embodiment of the present disclosure, tags with negative connotation are detected by finding pages which have an overall negative generic rating (more thumbs down than thumbs up), and then weighing the ratings for their tags by using the generic rating of the raters as opposed to the tag-specific ones. Generic ratings have a separate kind of matrix. In particular, the generic rating is computed from a matrix with thumbs up/thumbs down ratings associated with no tag.

An alternative embodiment for tags with negative connotations is to compute how well the tags Y given by a rater with high score for a tag X predicts the score for tag Y computed by the eigenvector of the Y matrix, and use a combination of scores of raters in matrices Y weighted by the predictivities Z (e.g. correlation coefficients). However, the problem with the latter approach is it favors people who score like the masses do, which is not necessarily good.

In the following paragraphs some mathematical formulations will be provided. As a starting point, a simple transitive case is used, where the tag rank is indicated with TR. In this example, rating is calculated in view of agreement/disagreement with a tag, e.g. John is a "jolly-good fellow"/John is not a "jolly-good fellow". By way of example, a universal identifier (UI) could be provided to allow raters to easily agree/disagree with common tags previously given to the entity being viewed. For example, identifier √ (check mark) could be provided for agreement and identifier x (cross) for disagreement. Alternatively, an identifier commonly used by a community or by a particular rater could be provided. Alternatively, users can rate each node using a star scheme or point scale or other rating scheme. Users could give a different rating for each tag.

In the following example, the "disagree" ratings influence the tag rank TR.

TR(node $n$, tag $t$) = sum over all nodes $n'$ who have rated n "agree" with tag $t$ of (TR($n'$,$t$)/# of nodes $n'$ has rated "agree" with tag $t$)–sum over all nodes $n'$ who have rated $n$ "disagree" with tag $t$ of (TR($n'$,$t$)/# of nodes $n'$ has rated "disagree" with tag $t$)     (Equation 1)

In the general case, one may compute the tag rank of a node N for tag t taking into account not only the tag rank of the raters of N for tag t, but also their tag rank for other tags for which a tag rank denotes authoritativeness on tag t. For example, someone with a high tag rank for the tag "smart" will have a high influence for the purpose of tagging "intelligent", not just "smart." In particular, authoritativeness may be computed by any measure of how well a tag rank for tag t' predicts accuracy in rating nodes with tag t. For example, the following formula can be used.

TR(node $n$, tag $t$) = sum over all nodes $n'$ who have rated $n$ "agree" with tag $t$ of [sum over all tags $t'$ of (predictivity($t' \rightarrow t$)*TR($n'$,$t'$)/# of nodes $n'$ has rated "agree" with tag $t$/sum over all tags $t'$ of predictivity($t' \rightarrow t$))]–sum over all nodes $n'$ who have rated $n$ "disagree" with tag $t$ of [sum over all tags $t'$ of (predictivity($t' \rightarrow t$)*TR($n'$,$t'$)/# of nodes $n'$ has rated "disagree" with tag $t$/sum over all tags $t'$ of predictivity($t' \rightarrow t$))]     (Equation 2)

Where
predictivity($t' \rightarrow t$)=coefficient of correlation between TR(t') and prediction accuracy, computed over all nodes (predictivity goes between −1 and 1)

prediction accuracy=1-prediction error
prediction error (t',t, node n)=abs(rating(t,n',n)−TR(t,n'))
(this assumes that TR's go between 0 and 1, −1 and 1 after the subtraction of the disagrees)
rating(t,n',n) is the rating for tag t given by n to n'
a rating is 1 if agree and −1 if disagree TR for each tag for each node can be displayed as the size of the font of the tag. Negative TRs can cause a tag to be prefixed with the word 'NOT'.

This definition takes care of tags with transitivity (where nodes highly rated for a tag are good judges of others for that tag, e.g. "smart"), tags with no transitivity (e.g. "stupid"), synonyms (see authoritativeness of smart people over intelligence, as explained above), antonyms—and tags with too little data (by pooling in authoritativeness from related tags). It is also robust to manipulation by users voting with the masses, as predictivities are computed for tag pairs, not nodes.

Some embodiments of the present disclosure can compute certainty of each tag rank, or a confidence interval, or error bar, that expresses how sure one is of the correctness of the value. As the amount of data used to compute a tag rank increases, the certainty increases. As for TR certainty (TRC), the following formula can be used:

TRC(TR(n,t))=square root of the sum over all nodes n' who have rated node n (agree or disagree) with tag t and over all tags t' of (predictivity(t'→t)*TR(n',t')/# of nodes n' has rated "agree" with tag t)   (Equation 3)

The presence of the square root is due to the fact that the error goes up with square root of the number of samples. The rest of the expression is a generalization of the number of samples, where each rating sample is weighed by its author's TR for tag t' and by the predictivity(t'→t), but inversely by how promiscuous or generous the rater is with tag t. Any measure that increases with the amount of data that went into the computation of a tag rank or decreases with the expected sample error will do, though.

For the purpose of display, TRCs can be converted into the percentile of TRC (n,t) with respect to all TRCs for tag t, i.e. the percentage of nodes with a higher or lower tag rank certainty for that tag. This percentile could also be computed with respect to all TRCs for node n if one is to express how common different tags are for a node without normalizing for overall tag frequency. TRCs for each tag for each node can be displayed as the contrast of the font of the tag. Tag ranks can also be expressed as percentiles.

A problem may arise with the use of many tags, which is that reputation information might lie distributed across the tag matrices corresponding to multiple tags with related meanings. For example, some people may label a node as funny while others label it as humorous. In some embodiments, this problem is addressed in the present disclosure by computing the probability that one tag predicts another, or correlation between tags, and computing a modified score for tag X that is the weighted average of the score for each Tag Y multiplied by the correlation between Y and X, or p(X|Y). A correlation between tags is defined as follows: given two vectors containing the probability of each rated node getting tagged with given tags X and Y, respectively, one embodiment of the correlation between these two tags is given by the correlation coefficient between the two dominant eigenvectors of X and Y. If the tags are related, the sites will obtain similar scores for both tags.

A further problem may arise when not enough data is available to construct a reliable tag matrix for a given tag, even after employing the above discussed correlation. One way in which the present disclosure addresses this problem is by using calculation of a score through the dominant eigenvector for a generic tagless rating matrix (employing a generic thumbs up/thumbs down or ratings system for each node) for node/tag pairs if they do not have enough data to compute a score for each tag, in combination with the actual tags applied to the node. Therefore, the rating of a generally highly rated rater who rates a node with a new tag would get weighted highly until enough data exists for the graph of that tag to evaluate tag-specific ratings for each rater. Alternatively, the same equations used above can be used in this instance, allowing nodes ranked with one tag to convey their influence to nodes ranked with another related tag.

The method in accordance with the present disclosure gives higher values for older nodes, because a new node cannot be rated by an older one that is no longer in use. For example, while Bill Clinton can rate Winston Churchill as a great leader, Churchill cannot return the favor. This inconsistency can be solved by keeping the dates of each rating and dividing the raw score of node X, obtained through the method of the present disclosure, by the fraction of all ratings/hyperlinks that are newer than the age of node X. Another embodiment divides by the number of nodes that are newer than node X, but the former is preferred.

All or the top tags for each web page, as ranked by tag rank, tag rank certainty or some combination of the two, can then be displayed for each web page and/or online identity. In one embodiment, they are displayed in a toolbar in the Internet browser, see toolbar 200 of FIG. 4. In another embodiment, they are displayed in a web page 450 associated with each web page 110. In a further embodiment, they are displayed in a display superimposed on the web page. In this case, the display can be triggered by a browser plugin, for example.

FIG. 4 shows an example of a toolbar 200 on a web browser. A toolbar is a frame or a special area of a web browser than contains icons allowing commands to be executed (tools, menu items, actions) and/or information. Toolbar 200 comprises, for example, a field 120 for a tag name to be assigned by the user, a symbol 510 (which can either be positive or negative or neither, such as a thumbs up or a thumbs down symbol), a score 160, and other additional fields 520, 530 such as a 'more info' field and a 'my stats' field. The toolbar 200 can also display ads and/or unpaid links to web pages, news and/or documents related to the web page 110 being browsed or the user's activity with any document in their computer to be shown, e.g., in fields 520, 530. Similarity between the web page 110 being browsed and the web pages to which ads or links lead to can be assayed by several methods familiar to one skilled in the art, including link analysis, semantic analysis, user behavior etc. Alternatively, a link can be offered to coupons for the web site/profile in question on the toolbar when viewing the corresponding web page.

The present disclosure also includes a toolbar for an Internet browser, similar in aspect to toolbar 200 discussed above, that provides information on the URL being visited and/or a link to such information. Such information could contain, for example, ads (i.e. advertisings) relevant to the web page being visited. Relevance of ads to a web page can be computed by any measure of semantic similarity between representations of the ad or the web page that clicking on the ad leads to, and of the web page being visited, for example, by latent semantic analysis (LSA) or by the dot product between vectors of word occurrences. Relevance can also be personalized to take into account the probability, based on a user's past behavior (including web pages visited, for example), that the user would be interested in an ad.

A possible field of use of the methods in accordance with the present disclosure is web search. If it is known what pages rank highly for a tag, this can be used to return results during the course of a tag search or a related query. In other words, users can search 'tagged' pages on the Web using keywords and filter web pages to be shown only those with a rating above a threshold for a particular tag (e.g. "cool" or "trustworthy").

According to a further embodiment, a generic "tagless" rating can be used for generic rankings of web pages and/or people, and used when raters emit a rating (e.g. thumbs up/thumbs down without typing in a tag or description. In some of the embodiments that combine a tagless rating with tags, the raters' tagless or generic rating or reputation is used to weigh their ratings of other people and/or web pages regardless of the tag they employ.

For some purposes, such as that of assigning reputation to a person, it would be useful to be able to establish whether a web page, such as an online profile of a person, corresponds to a given person. One instance of the problem reduces to that of associating an email address with a web page.

In accordance with the present disclosure, this is accomplished by providing the person who wishes to verify that they are associated with a given web page with a code (for example a randomly generated string of text and/or numbers and/or other symbols) that the person must insert in the (code for the) corresponding web page. Once the person has placed such string in the web page, the person notifies a service (e.g. clicks on a link) and a server or client verifies whether the code has indeed been inserted in the corresponding web page. In the affirmative case, the association between person and web page gets established. After such event, the person will be free to remove the code from the web page, if it is so desired. The tags and reputation assigned to the web page can subsequently be transferred to the person and affect his/her ratings of other web pages or profiles. In some embodiments, ownership or control of the web page is verified by forcing the owner of the site to place the code in a non-comment section of the web page that is not open for all to modify before the association between web page and user is established.

The user can be the owner of an email address. Further, the user can be identified by a user identifier, such as a username/password combination or an email address.

It should also be noted that while the ratings of trustworthy people are better indicators of others' trustworthiness, ratings of beautiful people need not be better indicators of others' beauty. The present disclosure provides a method by which it is possible to automatically detect which tags share a 'rater to rating transitivity' (such as the 'trustworthiness' rating) and which do not (such as the 'beauty' rating). One way of doing that is to measure the correlation between raters' ratings for tag T and the correlation between a rater's rating of web pages or profiles X and the computed score for the corresponding tag ranks of X in a first iteration of the tag rank computation, before the tag rank of a rater influences their influence. If there is a positive correlation, then raters highly rated for that tag are more predictive of the score than raters lowly rated for that tag and should thus be counted more heavily, so the standard tag rank algorithm can be applied. Such tags are said to exhibit rater to rating transitivity (RTRT) and for them, the score computation is performed as described above.

If there is no statistically significant positive correlation, then no RTRT applies, and the score is computed in the same way as done for tags with negative connotations, or using Equation 2 above.

In one of the applications of the present disclosure, users of a recommendation network can be allowed to find out how reputable each member in the network is without needing to know how trustworthy each of the recommenders is. This is done by computing, for example, the principal Eigenvector of a recommendation network made up of recommendations or endorsements between individuals, to compute the reputation of each individual.

According to a further embodiment of the present disclosure, the ratings can also come in the form of communications. For example, if member A sends an e-mail to member B, that could be counted as a vote from A to B. Likewise, if A replies fast to an e-mail from B, that can count as a vote from A to B inversely proportional to (or monotonically decreasing with) the time delay it took A to respond since the e-mail from B was received. Moreover, the use of reputation measured as the eigenvectors in a communication matrix of such communication can be used to combat spam.

According to a further embodiment of the present disclosure, the reputation of any node N in a network or graph with edges representing positive and negative 'endorsements', ratings or reviews can be compared as a function of the corresponding scalar from the dominant eigenvector of the matrix of positive endorsements, the number of negative endorsements received by node N, the number of negative endorsements given by each of the nodes that gave N a negative endorsement, and the reputation of the nodes that gave N a negative endorsement. In some such embodiments, the reputation of node N can be given by Equation 1 above.

According to another embodiment of the present disclosure, reputation of a user can be visible when the user leaves a comment on a web page of a web site (e.g. a blog). The comment can include computer program code that checks a server for reputation scores and/or tags when a web browser fetches the web page, so that the reputation is constantly updated. Reviews or comments left by the user will be more useful to other users if they know whether that user is trustworthy or not.

According to still another embodiment, the tag scores can be personalized by counting ratings by people with tastes similar to each user more than others.

Here is a possible embodiment for a single tag matrix, where a 'taggable' subject n is indicated by node n:

Personalized TR(node $n$,tag $t$,user $i$)=sum over all users $j$ of [similarity($i$, $j$)×positive_$n$ TR(user $j$, tag $t$)×positiverating (node $n$,tag $t$,user $j$)]+sum over all users $j$ of [similarity($i$, $j$)×negative_$n$ TR(user $j$,tag $t$)×negativerating (node $n$,tag $t$,user $j$)]    (Equation 4)

Where:
rating (node n, tag t, user j) is the rating given by user j to node n; for example, +1 for agree, −1 for disagree and 0 if no rating
positive_n TR(user j, tag t)=positive-rating-normalized TR=TR(user j, tag t)/sum of all "positive/agree" ratings given by user j for tag t
negative_n TR(user j, tag t)=negative-rating-normalized TR=TR(user j, tag t)/sum of all "negative/disagree" ratings given by user j for tag t And where similarity (i, j) is a measure of the similarity in ratings between user i and user j. For example, one embodiment of similarity is the cosine of the angle between, or the dot product of, the vectors representing users i and j in a matrix which is composed of the N principal components of a matrix M whose rows represent users and whose columns represent nodes (taggable objects) and where each cell contains a user's rating of a taggable object. In other words, a singular value decomposition (SVD) is performed to compute the N principal components of M using principal components analysis (PCA), project each user's row vector into the reduced dimensionality space, and measure their similarity between the projections of two user-vectors as their dot product or the cosine of the angle between them. The cosine is usually preferable as it can be negative and can thus express users with opposite tastes, and it is normalized to the interval between −1 and 1.

If the units of personalized TR are to be comparable to those of TR, a normalization can be used, so that the sum of all similarities (i, j) over all j equals 1. In other words:

Normalized Personalized TR(node $n$,tag $t$,user $i$)=Personalized TR(node $n$,tag $t$,user $i$)/sum over all $j$ of similarity$(i,j)$ (Equation 5)

For multiple interacting tag matrices with predictivities, this generalizes similarly to the way the non-personalized TR does, as shown in the following equation, where PTR stands for personalized TR, R stands for rating (between −1 and +1), and S stands for similarity.

PTR(node $n$,tag $t$,user $i$)=$\Sigma$(over $R$)$\Sigma$(over $j$)$\Sigma$(over $t$) of $[P(t',t) \cdot TRj \cdot Sij \cdot Rjnt]/[\Sigma$(over $n$)$Rjt] \cdot \Sigma$(over $t'$) $P(t' \to t)$] (Equation 6)

Equation 6 also includes a normalization, i.e. division by the sum over all ratings by j with tag t. The sum of Equation 2 includes positive terms in its first portion and negative terms in its second portion.

According to a further embodiment, the trust that user A should have in user B is given also by how much "dilution" has happened between A and B, where dilution is such that each node endorsed by A has 1/n of the trust of A, with n the number of nodes endorsed by A, and each node endorsed by a node X endorsed by A has 1/m of the trust that A has in X, and so on. In other words, the non-global trust can apply to more than just email networks.

Further embodiments of the present disclosure are also possible, where the teachings of the present disclosure are combined with the teachings of U.S. Ser. No. 11/704,729, filed on even date herewith, entitled "Method and System for Authentication of Electronic Communications", incorporated by reference in the present application.

While several illustrative embodiments of the invention have been shown and described, numerous variations and alternative embodiments will occur to those skilled in the art. Such variations and alternative embodiments are contemplated, and can be made without departing from the spirit and scope of the invention as defined in the appended claims.

The invention claimed is:

1. A method for rating an online entity in accordance with a tag, the method comprising:
arranging the online entity to be rated by a plurality of raters in accordance with the tag;
assigning a rater's score to the raters rating the online entity with the tag, to establish reputation of the raters;
assigning a tag score to the online entity, the tag score depending on
i) ratings provided by the raters to the online entity in accordance with the tag, and
ii) the reputation of all raters rating the online entity with the tag,
wherein assigning a tag score to the online entity is established through a raters/entities tag matrix associated with a graph connecting the raters and the online entity,
wherein assigning a rater's score to a rater Y rating the entity with a tag T is computed as a function of
i) ratings given to the rater Y,
ii) reputation of raters of the rater Y for each tag matrix of many tag matrices, and
iii) relationship between the many tag matrices and tag matrix T.

2. The method of claim 1, wherein the online entity is selected from the group consisting of a web page, an e-mail address, a telephone number and an online profile.

3. The method of claim 1, wherein assigning a rater's score to the raters rating the online entity with the tag is established by associating each rater with an online profile of the rater or one or more e-mail addresses of the rater.

4. The method of claim 1, wherein relationship between tag matrices Ti and Tj is given by a coefficient of correlation between scores computed for each entity for tag i and scores computed for a same entity for tag j.

5. The method of claim 1, wherein the tag score is calculated by calculating a dominant eigenvector of the tag matrix.

6. The method of claim 1, wherein the ratings provided by the raters to the entity in accordance with the tag are selected from the group consisting of Boolean ratings and multivalue ratings.

7. The method of claim 1, wherein the tag matrix allows assigning tag score to a plurality of entities in accordance with the tag, the dominant eigenvector for the tag matrix comprising a plurality of scalar values, each scalar value indicating a tag score for a particular entity for the tag.

8. The method of claim 1, wherein arranging the entity to be rated by a plurality of raters in accordance with the tag is established via a toolbar for the user's Internet browser.

9. The method of claim 1, wherein the online entity is definable as a node n, the tag is definable as a tag t, and the tag score is a tag score TR is given as TR(node $n$,tag $t$)=sum over all nodes $n'$ who have rated $n$ "agree" with tag $t$ of [sum over all tags $t'$ of (predictivity$(t' \to t)$*TR$(n',t)$/number of nodes $n'$ has rated "agree" with tag $t$/sum over all tags $t'$ of predictivity$(t' \to t)$)]−sum over all nodes $n'$ who have rated $n$ "disagree" with tag $t$ of [sum over all tags $t'$ of predictivity$(t' \to t)$*TR$(n',t)$/number of nodes $n'$ has rated "disagree" with tag $t$/sum over all tags $t'$ of predictivity$(t' \to t)$)].

10. The method of claim 1, wherein rating of the online entity is computed as a function of the eigenvector of a matrix of positive ratings and a negative rating, wherein the negative rating is computed as a function of a number of negative ratings and reputation or rating of raters who gave the negative ratings.

* * * * *